United States Patent [19]

Etzbach et al.

[11] Patent Number: 4,667,020
[45] Date of Patent: May 19, 1987

[54] AROMATIC DISAZO DYES AND LIQUID-CRYSTALLINE MATERIALS CONTAINING THESE DYES

[75] Inventors: Karl-Heinz Etzbach, Frankenthal; Christos Vamvakaris, Kallstadt, both of Fed. Rep. of Germany

[73] Assignee: BASF Aktiengesellschaft, Ludwigshafen, Fed. Rep. of Germany

[21] Appl. No.: 703,526

[22] Filed: Feb. 20, 1985

[30] Foreign Application Priority Data

Feb. 21, 1984 [DE] Fed. Rep. of Germany ....... 3406209

[51] Int. Cl.$^4$ .................... C09B 29/036; C09B 31/14; C09B 33/12; C09K 19/22
[52] U.S. Cl. ................... 534/577; 252/299.1; 252/299.61; 252/299.68; 534/573; 534/752; 534/756; 534/762; 534/764; 534/775; 534/797
[58] Field of Search ............... 534/577, 752, 756, 762, 534/764, 797, 775, 573

[56] References Cited

U.S. PATENT DOCUMENTS

| | | | |
|---|---|---|---|
| 4,344,880 | 8/1982 | Dehnert et al. | 534/797 |
| 4,493,532 | 1/1985 | Kaneko et al. | 534/577 X |

FOREIGN PATENT DOCUMENTS

| | | | |
|---|---|---|---|
| 0055838 | 7/1982 | European Pat. Off. | 534/577 |
| 0098522 | 1/1984 | European Pat. Off. | 534/577 |
| 2739972 | 3/1978 | Fed. Rep. of Germany | 534/797 |
| 3111937 | 10/1982 | Fed. Rep. of Germany | 534/752 |

*Primary Examiner*—Floyd D. Higel
*Attorney, Agent, or Firm*—Oblon, Fisher, Spivak, McClelland & Maier

[57] ABSTRACT

Compounds of the formula

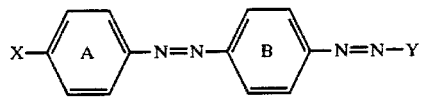

where X is a 5-membered heterocyclic structure from the oxazole, oxadiazole, thiazole, thiadiazole, imidazole or triazole series, Y is a radical of the formula

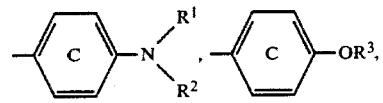

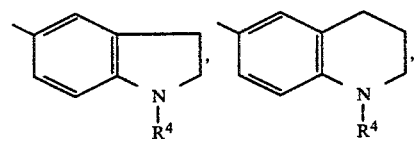

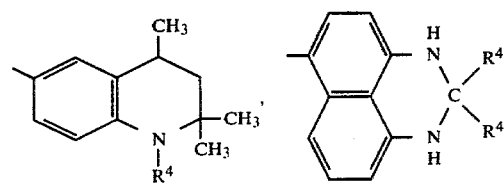

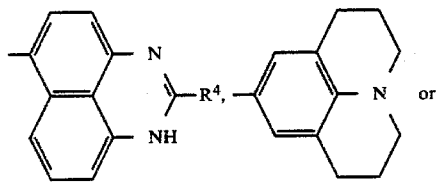

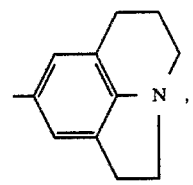

the rings A, B and C can be further substituted and can be fused to a benzene ring, $R^1$ and $R^2$ are each hydrogen or unsubstituted or substituted alkyl, aralkyl or cycloalkyl, or $R^1$ and $R^2$ together with the nitrogen are piperidino, pyrrolidino or morpholino, $R^3$ is hydrogen or unsubstituted or substituted alkyl, cycloalkyl, aralkyl, acyl, alkoxycarbonyl, aryloxycarbonyl or arylsulfonyl, and $R^4$ is hydrogen, alkyl or cycloalkyl, are particularly useful as dyes in liquid-crystalline media.

6 Claims, No Drawings

AROMATIC DISAZO DYES AND LIQUID-CRYSTALLINE MATERIALS CONTAINING THESE DYES

SUMMARY OF THE INVENTION

The present invention relates to compounds of the general formula I

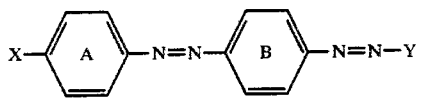

where X is a 5-membered heterocyclic structure from the oxazole, oxadiazole, thiazole, thiadiazole, imidazole or triazole series, Y is a radical of the formula

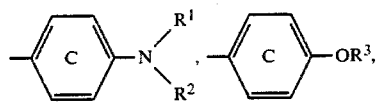

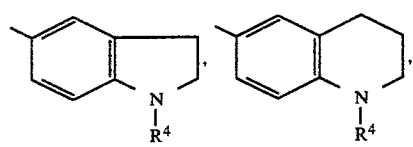

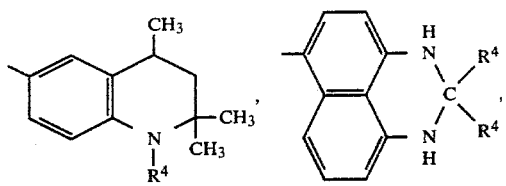

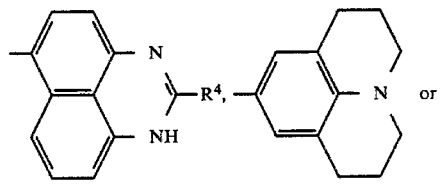

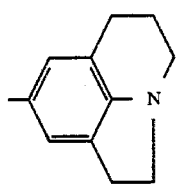

the rings A, B and C can be further substituted and can be fused to a benzene ring, $R^1$ and $R^2$ are each hydrogen or unsubstituted or substituted alkyl, aralkyl or cycloalkyl, or $R^1$ and $R^2$ together with the nitrogen are piperidino, pyrrolidino or morpholino, $R^3$ is hydrogen or unsubstituted or substituted alkyl, cycloalkyl, aralkyl, acyl, alkoxycarbonyl, aryloxycarbonyl or arylsulfonyl and $R^4$ is hydrogen, alkyl or cycloalkyl.

DETAILED DESCRIPTION OF THE PREFERRED EMBODIMENTS

The ring A can be further substituted by, for example, chlorine, bromine, cyano, methyl, ethyl, methoxy, ethoxy or hydroxyl.

Examples of suitable substituents for the ring B are chlorine, bromine, methyl, ethyl, methoxy, ethoxy, acetylamino, propionylamino or a fused-on benzene ring.

The ring C can carry, as substituents, for example chlorine, bromine, methyl, ethyl, methoxy, ethoxy, acetylamino, propionylamino or a fused-on benzene ring.

$R^1$ and $R^2$ are each hydrogen or, for example, methyl, ethyl, butyl, hexyl, heptyl, octyl, dodecyl, cyclohexyl, 2-phenylethyl, 2-cyanoethyl, 2-hydroxyethyl, 2-acetoxyethyl, 2-butyryloxyethyl, allyl, phenylmethyl, 4-butylphenylmethyl, 4-cyclohexylphenylmethyl or 4-(4'-butylcyclohexyl)-phenylmethyl.

$R^3$ is, for example, $C_1$–$C_{12}$-alkyl which may or may not be interrupted by oxygen, $C_5$–$C_7$-cycloalkyl, phenylmethyl, 2-phenylethyl, 4-($C_1$–$C_{12}$-alkyl)-phenylmethyl, 4-cyclohexylphenylmethyl, 4-(4'-$C_1$–$C_7$-alkylcyclohexyl)-phenylmethyl, 4'-($C_1$–$C_{12}$-alkoxy)-phenylmethyl, 4-phenoxyphenylmethyl, 4-phenylmethyloxyphenylmethyl, 4-($C_1$–$C_{12}$-alkanoyloxy)-phenylmethyl or benzoyloxyphenylmethyl.

Specific examples of radicals $R^3$, in addition to those stated above, are ethyl, propyl, butyl, octyl, 2-ethylhexyl, isononyl, dodecyl, 2-butoxyethyl, cyclohexyl, 4-butylphenylmethyl, 4-(4'-ethylcyclohexyl)-phenylmethyl, 4-(4'-propylcyclohexyl)-phenylmethyl, 4-(4'-butylcyclohexyl)-phenylmethyl, 4-(4'-pentylcyclohexyl)-phenylmethyl, 4-(4'-heptylcyclohexyl)-phenylmethyl, 4-butoxyphenylmethyl, 4-isononyloxyphenylmethyl, 4-butyryloxyphenylmethyl and 4-caproyloxyphenylmethyl.

$R^4$ is hydrogen or, for example, methyl, ethyl, butyl or cyclohexyl.

Specific examples of the radicals X are those of the formulae:

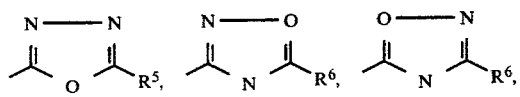

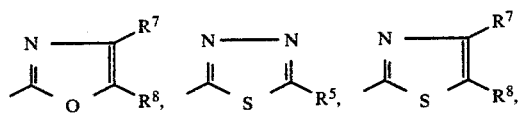

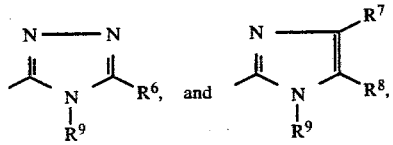

where $R^5$ is hydrogen, unsubstituted or substituted alkyl, cycloalkyl or aryl, or unsubstituted or substituted alkyl- or cycloalkylmercapto, $R^6$ is hydrogen, unsubstituted or substituted alkyl, cycloalkyl or aryl, $R^7$ and $R^8$ are each hydrogen, unsubstituted or substituted alkyl, cycloalkyl or phenyl or a carboxylic ester group, or $R^7$ and $R^8$ together form an unsubstituted or substituted fused-on benzene ring, and $R^9$ is hydrogen, unsubstituted or substituted alkyl, cycloalkyl or phenyl.

$R^5$ is, for example, $C_1-C_{12}$-alkyl, $C_2$- or $C_3$-alkyl which is substituted by hydroxyl, $C_1-C_{12}$-alkoxy, phenyl or phenoxy, phenylmethyl, $C_5-C_7$-cycloalkyl, phenyl which is unsubstituted or substituted by $C_1-C_{12}$-alkyl, phenylmethyl, phenylethyl, $C_1-C_{12}$-alkoxy, phenoxy, phenylmethoxy, $C_1-C_{12}$-alkanoyloxy, benzoyloxy, phenyl, diphenyl, cyclohexyl, 4-($C_1-C_7$-alkylcyclohexyl), a carboxylic ester group of chlorine, $C_1-C_{12}$-alkylthio, $C_5-C_7$-cycloalkyl-thio, phenylmethylthio which is substituted by $C_1-C_{12}$-alkyl, phenylmethyl, phenylethyl, $C_1-C_{12}$-alkoxy, phenoxy, phenylmethoxy, $C_1-C_{12}$-alkanoyloxy, benzoyloxy, phenyl, diphenyl, cyclohexyl, 4-($C_1-C_7$-alkylcyclohexyl), a carboxylic ester group or chlorine, or unsubstituted or substituted 2-phenylethylthio.

Specific examples of radicals $R^5$ are methyl, ethyl, isopropyl, butyl, isobutyl, pentyl, hept-3-yl, octyl, nonyl, dodecyl, 2-hydroxyethyl, 2-methoxyethyl, 2-butoxyethyl, 2-phenylethyl, 3-butoxypropyl, cyclopentyl, phenyl, 4-methylphenyl, 4-butylphenyl, 4-octylphenyl, 4-nonylphenyl, 4-butoxyphenyl, 4-isononyloxyphenyl, 4-butyryloxyphenyl, 4-benzoyloxyphenyl, 4-phenylphenyl, 4-cyclohexylphenyl, 4-(4'-ethylcyclohexyl)-phenyl, 4-(4'-propylcyclohexyl)-phenyl, 4-(4'-butylcyclohexyl)-phenyl, 4-(4'-pentylcyclohexyl)-phenyl, 4-chloro phenyl, methylthio, ethylthio, butylthio, octylthio, 2-ethylhexylthio, isononylthio, cyclohexylthio, 4-methylphenylmethylthio, 4-butylphenylmethylthio, 4-butoxyphenylmethylthio, 4-hexyloxyphenylmethylthio, 4-dodecyloxyphenylmethylthio, 4-phenoxyphenylmethylthio, 4-phenylmethoxyphenylmethylthio, 4-acetoxyphenylmethylthio, 4-butyryloxyphenylmethylthio, 4-caproyloxyphenylmethylthio, 4-benzoyloxyphenylmethylthio, 4-phenylphenylmethylthio, 4-cyclohexylphenylmethylthio, 4-(4'-ethylcyclohexyl)-phenylmethylthio, 4-(4'-propylcyclohexyl)-phenylmethylthio, 4-(4'-butylcyclohexyl)phenylmethylthio, 4-(4'-pentylcyclohexyl)-phenylmethylthio and 2-phenylethylthio.

In conformity with the general definition, $R^6$ has the same meanings as $R^5$.

$R^7$ and $R^8$ are each, for example, $C_1-C_4$-alkyl, or are each phenyl which is unsubstituted or substituted by $C_1-C_4$-alkyl, chlorine or bromine, or are each $C_5-C_7$-cycloalkyl or $C_1-C_8$-alkoxycarbonyl.

Specific examples of radicals $R^7$ and $R^8$, which may be identical or different, are methyl, ethyl, phenyl, p-chlorophenyl, ethoxycarbonyl, butoxycarbonyl and cyclohexyl.

Fused-on benzene rings (for $R^7$ and $R^8$ together) can be substituted by, for example, methyl, ethyl, methoxy, ethoxy, butoxy or chlorine.

$R^9$ is hydrogen or, for example, methyl, ethyl, butyl, phenyl, 4-ethylphenyl or 4-butylphenyl.

Preferred compounds of the formula I are those in which X is a symmetric (1,3,4) oxadiazolyl or thiadiazolyl radical.

Examples of preferred substituents of $R^5$ for these radicals are propyl, butyl, hexyl, hept-3-yl, octyl, nonyl, dodecyl, 4-butylphenyl, 4-cyclohexylphenyl, 4-(4'-$C_2-C_7$-alkylcyclohexyl)-phenyl, butylthio, hexylthio, octylthio, 2-ethylhexylthio, isononylthio, dodecylthio, phenylmethylthio, 4-butylphenylmethylthio, 4-cyclohexylphenylmethylthio, 4-(4'-$C_2-C_7$-alkylcyclohexyl)-phenylmethylthio, 4-($C_4-C_{12}$-alkoxy)-phenylmethylthio and 4-phenylmethoxyphenylmethylthio.

The compounds of the formula I are particularly useful as pleochroic dyes in electro-optical liquid crystal displays of the guest-host type, and for the production of colored polarizing films.

Liquid-crystalline materials which contain pleochroic dyes are used in displays. The principles of the use according to the invention are known and are described in, for example, H. Kelker and R. Hatz, Handbook of Liquid Crystals, page 611 et seq. (1980), R. J. Cox, Mol. Cryst. Liq. Cryst. 55 (1979), page 51 et seq., and L. Pauls and G. Schwarz, Elektronik 14 (1982), page 66 et seq. Further literature which gives a detailed description of the use according to the invention is referred to in the stated publications.

Dyes for liquid-crystalline mixtures must meet a number of requirements (cf., for example, J. Constant et al., J. Phys. D: Appl. Phys. 11 (1978), page 479 et seq., F. Jones and T. J. Reeve, Mol. Cryst. Liq. Cryst. 60 (1980), page 99 et seq., and European Pat. Nos. 43,904, 55,838, and 65,869). They must not ionize in an electric field, must have a very high molar extinction coefficient and good solubility in the liquid crystal matrix used, must be chemically and, in particular, photochemically stable and, in order to achieve good contrast of the guest-host display, must possess a degree of order S of greater than 0.75 in the particular nematic phase.

Dyes which meet these requirements are predominantly those from the class consisting of the anthraquinones (cf., for example, European Pat. Nos. 56,492, 44,893, 59,036 and 54,217).

To date, azo dyes have the particular disadvantage that either the solubility or the light-stability is inadequate.

Surprisingly, the novel dyes have a high degree of order coupled with high solubility and good light-stability in the particular liquid crystal matrix.

The use of dichroic dyes for the preparation of polarizing films is described by, for example, R. Mizoguchi et al. in Displays 4 (1983), page 201 et seq., where further literature is also cited.

The compounds of the formula I can be prepared by reducing a compound of the formula II

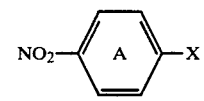

to a compound of the formula III

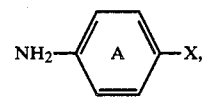

diazotizing this with, for example, nitrosylsulfuric acid in glacial acetic acid and then reacting the product with a coupling component of the formula

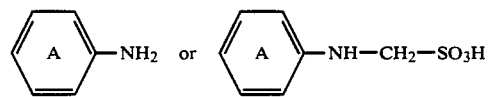

to give a compound of the formula IV

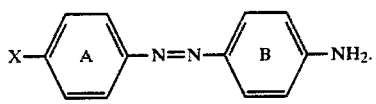

If the compound of the formula IV is diazotized and the product then coupled with a compound of the formula HY (where $R^3$ is H), a compound of the formula I is obtained; the desired radical $R^3$ can then be introduced into this compound, in which $R^3$ is H, by a conventional method.

The compounds of the formula II can be prepared by a conventional method (cf., for example, J. H. Boyer in Heterocyclic Compounds, (R. C. Elderfield), volume 7, page 508 et seq. and page 525 et seq., John Wiley and Sons Inc., New York 1961, W. R. Sherman, ibid., page 558 et seq. and page 587 et seq., G. Vernin in The Chemistry of Heterocyclic Compounds (A. Weissberger and E. C. Taylor), volume 34/1, page 166 et seq., John Wiley and Sons, New York 1979, and C. Temple in The Chemistry of Heterocyclic Compounds, A. Weissberger and E. C. Taylor, volume 37, page 30 et seq. and page 62 et seq., John Wiley and Sons, New York 1981).

The reduction of the compounds of the formula II to compounds of the formula III is carried out, for example, with hydrogen/Raney nickel in glacial acetic acid or with sodium sulfide in dioxane (cf., for example, Yang-i Lin and S. A. Lang, J. Heterocycl. Chem. 17 (1980), 1273).

The dyes can be purified by chromatography over silica gel using a toluene/ethyl acetate mixture as the mobile phase. They are then recrystallized, for example from toluene. The purity is checked by means of thin layer chromatography and elemental analysis.

Typical methods of preparation are described in Examples 1 and 2 below. The parts and percentages are by weight, unless stated otherwise.

Of particular importance are compounds of the formula Ia

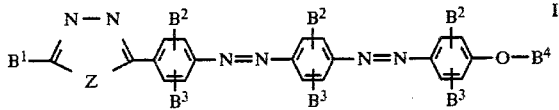

where Z is oxygen or sulfur, $B^1$ is hydrogen, unsubstituted or substituted alkyl, cycloalkyl or aryl or unsubstituted or substituted alkyl- or cycloalkylmercapto, $B^2$ and $B^3$ independently of one another are each hydrogen or methyl, and $B^4$ is $C_1$-$C_{12}$-alkyl, cyclohexyl, benzyl, 4-($C_1$-$C_{12}$-alkyl)-benzyl, 4-cyclohexylbenzyl or 4-(4'-$C_1$14 $C_7$-alkylcyclohexyl)-benzyl.

Other particularly important compounds are those of the formula Ib

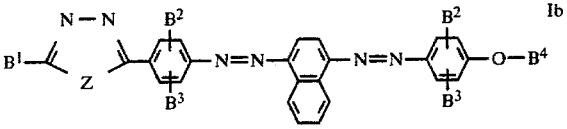

where Z, $B^1$, $B^2$, $B^3$ and $B^4$ have the meanings given for formula Ia.

Further preferred compounds are those of the formula Ic

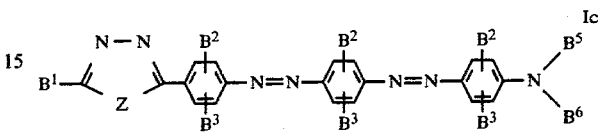

where Z, $B^1$, $B^2$ and $B^3$ have the meanings given for formula Ia, and $B^5$ and $B^6$ independently of one another are each hydrogen, $C_1$-$C_8$-alkyl, 2-phenylethyl, benzyl, 4-($C_1$-$C_{12}$-alkyl)-benzyl, 4-cyclohexylbenzyl, 4-(4'-$C_1$-$C_7$-alkylcyclohexyl)-benzyl or cyclohexyl, or $B^5$ and $B^6$ together with the nitrogen form pyrrolidino, piperidino or morpholino.

Further particularly important compounds are those of the formula Id

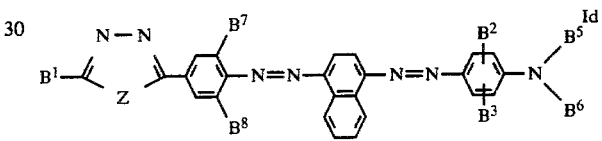

where $B^1$, $B^2$, $B^3$, $B^5$ and $B^6$ have the meanings given for formula Ic, and $B^7$ and $B^8$ independently of one another are each hydrogen, bromine, chlorine or cyano.

Compounds of the formula Ie

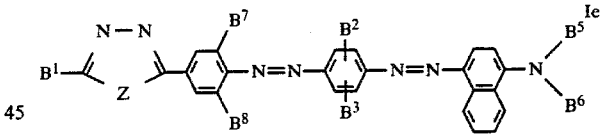

where $B^1$, $B^2$, $B^3$, $B^5$, $B^6$, $B^7$ and $B^8$ have the meanings given for formula Id, are also particularly important.

GENERAL METHODS OF PREPARATION

EXAMPLE 1

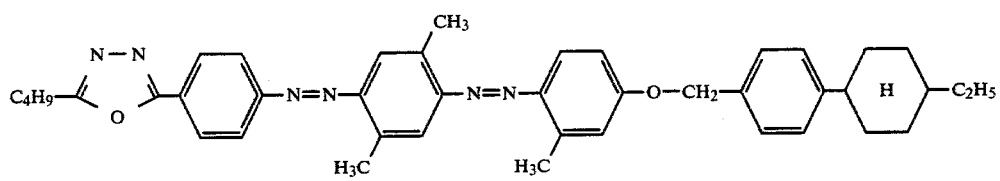

121 parts of valeryl chloride are added to a mixture of 181 parts of p-nitrobenzoic acid hydrazide, 101 parts of triethylamine and 1,000 parts of N-methylpyrrolidone, while cooling with ice. The solution is then stirred for a further 4 hours at room temperature, after which it is poured into 5,000 parts of water, and the resulting precipitate is filtered off under suction, washed with water and dried. 250 parts (95% of theory) of N-(p-nitrobenzoyl)-N'-valerylhydrazine of melting point 185°–187° C. are obtained.

A mixture of 80 parts of the above product, 5 parts of p-toluenesulfonic acid and 800 parts of xylene is heated at the boil for 4 hours under a water separator. The solution is then poured into 2,000 parts of saturated aqueous sodium bicarbonate solution, the organic phase is separated off and washed three times with water, the toluene solution is dried with sodium sulfate and then filtered, and the filtrate is evaporated to dryness under reduced pressure. 52 parts (70% of theory) of 2-butyl-5-(p-nitrophenyl)-1,3,4-oxadiazole of melting point 68°–70° C. are obtained.

A mixture of 24.7 parts of 2-butyl-5-(p-nitrophenyl)-1,3,4-oxadiazole, 2.5 parts of an aqueous Raney nickel suspension and 250 parts of glacial acetic acid is hydrogenated at room temperature, while shaking. When the absorption of hydrogen is complete, 2.5 parts of active carbon are added, the mixture is filtered, the filtrate is poured into saturated aqueous sodium chloride solution, and the resulting precipitate is filtered off under suction, washed with water and dried. 16 parts (74% of theory) of 2-butyl-5-(p-aminophenyl)-1,3,4-oxadiazole of melting point 125° C. (toluene) are obtained.

18 parts of 34% strength nitrosylsulfuric acid are added to a mixture of 10.9 parts of 2-butyl-5-(p-aminophenyl)-1,3,4-oxadiazole, 70 parts of glacial acetic acid and 30 parts of propionic acid at 5° C., and the mixture is then stirred for a further 3 hours at this temperature. The diazonium salt solution is then added to a mixture of 6.1 parts of 2,5-dimethylaniline in 100 parts of glacial acetic acid, while cooling with ice. The solution is left to reach room temperature, after which the resulting dye of the formula

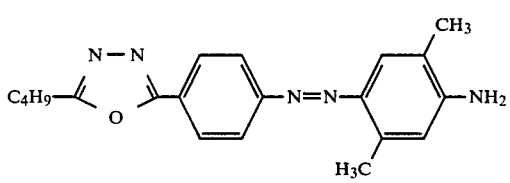

is precipitated by adding 600 parts of water. The precipitate is filtered off under suction and washed with water, with a concentrated aqueous sodium acetate solution and then again with water. The residue is sucked thoroughly dry and then taken up in 140 parts of glacial acetic acid and 60 parts of propionic acid, after which 15 parts of a 23% strength aqueous sodium nitrite solution are added to this solution at 5° C., followed by the addition of 20 parts of concentrated hydrochloric acid, and the mixture is stirred for 3 hours at 5° C. The diazonium salt solution formed is filtered, and the filtrate is added to a solution of 5.4 parts of m-cresol in 1000 parts of water and 2 parts of sodium hydroxide solution, while cooling with ice. The pH of the solution is kept at 7 during this procedure by adding 10% strength sodium hydroxide solution. The mixture is then stirred overnight at room temperature, and the resulting dye is filtered off under suction, washed with water and dried. 17.8 parts (76% of theory) of the bisazo dye of the formula

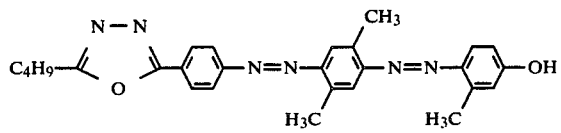

are obtained. Melting point: 244° C.

A mixture of 4.7 parts of the above bisazo dye, 2.4 parts of 4-(4'-ethylcyclohexyl)-benzyl chloride, 1.4 parts of potassium carbonate and 40 parts of dimethylformamide is stirred for 2 hours at 100° C. and then introduced into 200 parts of water. The resulting precipitate is filtered off under suction, washed with water and dried to give 5.9 parts (84% of theory) of the crude dye of Example 1, which is purified by repeated recrystallization from toluene. Melting point: 160° C., λmax (CH$_2$Cl$_2$): 405 nm.

EXAMPLE 2

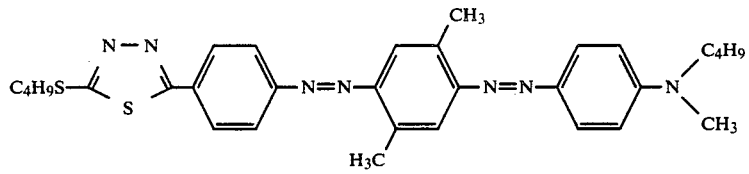

85.9 parts n-butyl bromide are added to a suspension of 91 parts of potassium dithiocarbazate in 900 parts of N-methylpyrrolidone, while cooling with ice, and the mixture is then stirred for 2 hours at room temperature. Thereafter, 116.7 parts of p-nitrobenzoyl chloride are added while cooling with ice, stirring is continued for a further 2 hours at room temperature, and the reaction mixture is poured into 3,000 parts of ice water. The butyl 3-(p-nitrobenzoyl)-dithiocarbazate initially obtained as an oil crystallizes on standing overnight, and is then filtered off under suction and washed with water. The residue is sucked thoroughly dry and then introduced into 1,000 parts of concentrated sulfuric acid, the mixture is stirred for 1 hour at 50° C. and then poured into 3,000 parts of ice water, and the precipitate is filtered off under suction, dried, and recrystallized from glacial acetic acid. 130 parts (70% of theory) of pure 2-butylthio-5-(p-nitrophenyl)-1,3,4-thiadiazole of melting point 140° C. are obtained.

Hydrogenation to give 2-butylthio-5-(p-aminophenyl)-1,3,4-thiadiazole is carried out by the method described in Example 1. Yield: 71% of theory, melting point: 91° C. (toluene).

13.3 parts of 2-butylthio-5-(p-aminophenyl)-1,3,4-thiadiazole are diazotized with 18 parts of 34% strength nitrosylsulfuric acid in 70 parts of glacial acetic acid and 30 parts of propionic acid, and the product is coupled to 6.1 parts of 2,5-dimethylaniline in 100 parts of glacial acetic acid, these steps being carried out as described in Example 1. The monoazo dye of the formula

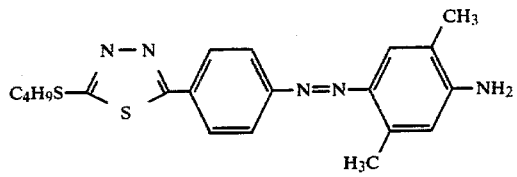

is obtained. This is sucked thoroughly dry on the suction filter and then suspended in 140 parts of glacial acetic acid and 50 parts of propionic acid, after which 15 parts of a 23% strength aqueous sodium nitrite solution are added to this mixture at 5° C., followed by the addition of 20 parts of concentrated hydrochloric acid, and the mixture is stirred for 4 hours at 5° C. The diazonium salt solution is then filtered, and the filtrate is added to a mixture of 8.2 parts of N-butyl-N-methylaniline, 150 parts of isobutanol, 200 parts of saturated aqueous sodium acetate solution and 100 parts of ice. The mixture is stirred overnight, and the resulting dye is filtered off under suction, washed with water, with methanol and then again with water, and dried to give 18 parts (63% of theory) of the crude dye of Example 2, which is purified by chromatography over silica gel (Merck, silica gel 60, 0.063–0.0200 nm) using a 40:1 toluene/ethyl acetate mixture as the eluent, followed by recrystallization from toluene.

Melting point: 150° C., λmax ($CH_2Cl_2$): 505 nm.

-continued

| Example | Structure | m.p. | λmax. (CH$_2$Cl$_2$) |
|---|---|---|---|
| 11 | (C$_2$H$_5$)(C$_4$H$_9$)CH–C(=N–N–)(O–)–[C$_6$H$_4$]–N=N–[naphthyl]–N=N–[C$_6$H$_4$]–N(CH$_3$)(C$_4$H$_9$) | 96° C. | 539 nm |
| 12 | (C$_2$H$_5$)(C$_4$H$_9$)CH–C(=N–N–)(O–)–[C$_6$H$_4$]–N=N–[naphthyl]–N=N–[naphthyl]–NHC$_2$H$_5$ | 174° C. | 565 nm |
| 13 | C$_4$H$_9$–C(=N–N–)(O–)–[C$_6$H$_3$(CN)]–N=N–[naphthyl]–N=N–[C$_6$H$_4$]–N(CH$_3$)(C$_4$H$_9$) | 202° C. | 605 nm |
| 14 | C$_8$H$_{17}$S–C(=N–N–)(S–)–[C$_6$H$_4$]–N=N–[naphthyl]–N=N–[C$_6$H$_4$]–N(CH$_3$)(C$_4$H$_9$) | 153° C. | 542 nm |
| 15 | (C$_2$H$_5$)(C$_4$H$_9$)CH–CH$_2$–S–C(=N–N–)(S–)–[C$_6$H$_4$]–N=N–[naphthyl]–N=N–[C$_6$H$_4$]–N(CH$_3$)(C$_4$H$_9$) | 114° C. | 543 nm |
| 16 | (CH$_3$)(C$_7$H$_{15}$)CH–S–C(=N–N–)(S–)–[C$_6$H$_4$]–N=N–[naphthyl]–N=N–[C$_6$H$_4$]–N(CH$_3$)(C$_4$H$_9$) | 122° C. | 541 nm |
| 17 | C$_4$H$_9$S–C(=N–N–)(S–)–[C$_6$H$_3$(CN)]–N=N–[naphthyl]–N=N–[C$_6$H$_4$]–N(CH$_3$)(C$_4$H$_9$) | 169° C. | 583 nm |
| 18 | (C$_2$H$_5$)(C$_4$H$_9$)CH–CH$_2$–S–C(=N–N–)(S–)–[C$_6$H$_4$]–N=N–[naphthyl]–N=N–[C$_6$H$_3$(CH$_3$)]–OCH$_2$–[C$_6$H$_4$]–[cyclohexyl-H]–C$_4$H$_9$ | 144° C. | 453 nm |
| 19 | (H$_3$C)(C$_7$H$_{15}$)CH–S–C(=N–N–)(S–)–[C$_6$H$_4$]–N=N–[naphthyl]–N=N–[C$_6$H$_3$(CH$_3$)]–OCH$_2$–[C$_6$H$_4$]–[cyclohexyl-H]–C$_4$H$_9$ | 150° C. | 452 nm |

TABLE 1

| Example | Degree of order S (at room temp.) | Solubility L (at room temp.) | Liquid crystal mixture |
|---|---|---|---|
| 1 | 0.76 | 1.6% | ZLI 1840 |
|   | 0.76 | 1.3% | ZLI 1957/5 |
| 2 | 0.74 | 1.1% | ZLI 1957/5 |
| 4 | 0.78 | <0.2% | ZLI 1840 |
| 5 | 0.73 | 1.4% | ZLI 1840 |
|   | 0.73 | 1.3% | ZLI 1957/5 |
| 6 | 0.68 | >5% | ZLI 1957/5 |
| 7 | 0.74 | 1.4% | ZLI 1840 |
| 8 | 0.76 | 1.3% | ZLI 1840 |
|   | 0.78 | 0.5% | ZLI 1957/5 |
| 9 | 0.79 | 0.6% | ZLI 1840 |

TABLE 1-continued

| Example | Degree of order S (at room temp.) | Solubility L (at room temp.) | Liquid crystal mixture |
|---|---|---|---|
|    | 0.77 | 0.3% | ZLI 1957/5 |
| 10 | 0.74 | 1.2% | ZLI 1957/5 |
| 11 | 0.74 | >5% | ZLI 1957/5 |
| 12 | 0.71 | 0.8% | ZLI 1957/5 |

TABLE 2

| Example | Degree of order S (at room temp.) | Solubility L (at room temp.) | Liquid crystal mixture |
|---------|-----------------------------------|------------------------------|------------------------|
| 14 | 0.77 | 0.7% | ZLI 1957/5 |
| 15 | 0.8 | >5% | ZLI 2452 |
| 16 | 0.81 | >5% | ZLI 2452 |
| 17 | 0.75 | — | ZLI 1957/5 |
| 18 | 0.82 | 3.1% | ZLI 2452 |
| 19 | 0.77 | >5% | ZLI 1957/5 |
|    | 0.84 | >5% | ZLI 2452 |

The degree of order S measured at room temperature, the solubility L, likewise determined at room temperature, and the Merck liquid crystal mixtures used are summarized in Table 1 for the Examples 1, 2 and 4–12.

Table 2 shows the degree of order S and the solubility L, likewise determined at room temperature, for the Examples 14–19, measured in ZLI 1957/5 or ZLI 2452.

The degree of order S was determined in commercial measuring cells with a homogeneous edge orientation, using the known equation $$S = \frac{CR - 1}{CR + 2}$$

(polyimide). The dichroic ratio CR was determined by measuring the extinctions $E\|$ (measurement with light polarized parallel to the preferred direction of the nematic phase) and $E\perp$ (measurement with light polarized at right angles to the preferred direction of the nematic phase) and using the relationship $$CR = \frac{E\|}{E\perp}$$

the dye concentration being chosen so that $E\|$ was from 1 to 2. The measurements were carried out on a Beckmann Acta CIII spectrophotometer.

FIG. 1 shows the extinctions $E\|$ and $E\perp$ for the compound of Example 9 in ZLI 1840.

The solubility was determined as follows:

50 mg of the particular dye were stirred in 1 ml of liquid-crystalline mixture for 1 week at room temperature, the saturated solution was separated from the residue by centrifuging, and the solubility was determined by comparison of the extinctions.

The light-stability of the dyes in the particular liquid-crystalline mixture was determined by high-speed exposure of the solution in the measuring cell in a Suntest apparatus (Hanau) at 25° C. The dyes exhibited good light-stability, particularly when a UV protective coating was used. FIGS. 2 and 3 show the percentage change in $E\|$ with exposure time for the Examples 1 and 5, measured in ZLI 1840.

We claim:

1. An azo dye of the formula:

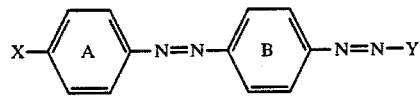

wherein:

X is a 5-membered heterocyclic ring selected from the group consisting of oxadiazole, thiadiazole, thiazole, an oxadiazole ring substituted by $C_1$–$C_{12}$ alkyl, $C_2$- or $C_3$-alkyl substituted by hydroxyl, $C_1$–$C_{12}$ alkoxy, phenyl or phenoxy, phenylmethyl, $C_5$–$C_7$-cycloalkyl, phenyl, or phenyl substituted by $C_1$–$C_{12}$-alkyl, phenylmethyl, phenylethyl, $C_1$–$C_{12}$-alkoxy, phenoxy, phenylmethoxy, $C_1$–$C_{12}$-alkanoyloxy, benzoyloxy, phenyl, diphenyl, cyclohexyl, 4-($C_1$–$C_7$-alkylcyclohexyl), carboxylic ester or chlorine, $C_1$–$C_{12}$-alkylthio, $C_5$–$C_7$-cycloalkylthio, phenylmethylthio substituted by $C_1$–$C_{12}$-alkyl, phenylmethyl, phenylethyl, $C_1$–$C_{12}$-alkoxy, phenoxy, phenylmethoxy, $C_1$–$C_{12}$ alkanoyloxy, benzoyloxy, phenyl, diphenyl, cyclohexyl, 4-($C_1$–$C_7$-alkylcyclohexyl), carboxylic ester or chlorine, or 2-phenylethylthio, a thiadiazole ring substituted by $C_1$–$C_{12}$-alkyl, $C_2$- or $C_3$-alkyl substituted by hydroxyl, $C_1$–$C_{12}$-alkoxy, phenyl or phenoxy, phenylmethyl, $C_5$–$C_7$-cycloalkyl, phenyl, or phenyl substituted by $C_1$–$C_{12}$-alkyl, phenylmethyl, phenylethyl, $C_1$–$C_{12}$-alkoxy, phenoxy, phenylmethoxy, $C_1$–$C_{12}$ alkanoyloxy, benzoyloxy, phenyl, diphenyl, cyclohexyl, 4-($C_1$–$C_7$-alkylcyclohexyl), carboxylic ester or chlorine, $C_1$–$C_{12}$-alkylthio, $C_5$–$C_7$-cycloalkylthio, phenylmethylthio substituted by $C_1$–$C_{12}$-alkyl, phenylmethyl, phenylethyl, $C_1$–$C_{12}$-alkoxy, phenoxy, phenylmethoxy, $C_1$–$C_{12}$-alkanoyloxy, benzoyloxy, phenyl, diphenyl, cyclohexyl, 4-($C_1$–$C_7$-alkylcyclohexyl), carboxylic ester or chlorine, or 2-phenylethylthio or a thiazole ring substituted by $C_1$–$C_4$-alkyl, phenyl, phenyl substituted by $C_1$–$C_4$-alkyl, chlorine or bromine, $C_5$–$C_7$-cycloalkyl or $C_1$–$C_8$-alkoxycarbonyl;

Y is a radical of the formula:

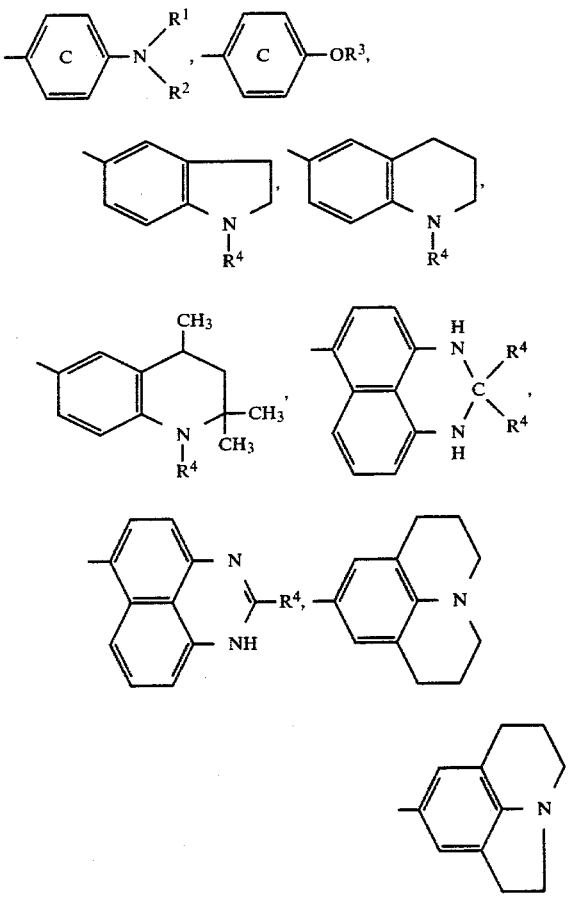

the rings, A, B and C are each independently unsubstituted, or ring A is substituted by chlorine, bromine, cyano, methyl, ethyl, methoxy, ethoxy or hydroxyl, or ring B is substituted by chlorine, bromine, methyl, ethyl, methoxy, ethoxy, acetylamino, propionylamino or ring B is a naphthyl ring, or ring C is substituted by chlorine, bromine, methyl, ethyl, methoxy, ethoxy, acetylamino, propionylamino or ring C is a naphthyl ring;

$R^1$ and $R^2$ are each independently hydrogen, $C_1-C_{12}$ alkyl, cyclohexyl, 2-phenylethyl, 2-cyanoethyl, 2-hydroxyethyl, 2-acetoxyethyl, 2-butyryloxyethyl, allyl, phenylmethyl, 4-butylphenylmethyl, 4-cyclohexylphenylmethyl or 4-(4'-butylcyclohexyl)-phenylmethyl; or $R^1$ and $R^2$, together with a nitrogen atom to which they are both bound, are piperidino, pyrrolidino or morpholino;

$R^3$ is $C_1-C_{12}$ alkyl, $C_1-C_{12}$ alkyl interrupted by oxygen, $C_5-C_7$ cycloalkyl, phenylmethyl, 2-phenylethyl, 4-($C_1-C_{12}$-alkyl)-phenylmethyl, 4-cyclohexylphenylmethyl, 4-(4'-$C_1-C_7$-alkylcyclohexyl)-phenylmethyl, 4'-($C_1-C_{12}$-alkoxy)-phenylmethyl, 4-phenoxyphenylmethyl, 4-phenylmethyloxyphenylmethyl, 4-($C_1-C_{12}$-alkanoyloxy)-phenylmethyl, benzoyloxyphenylmethyl or 4-caproyloxyphenylmethyl; and $R^4$ is hydrogen, $C_1-C_4$ alkyl or cyclohexyl.

2. The compound of claim 1, wherein the said compound has the formula:

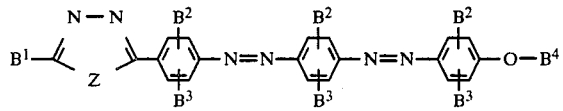

wherein:

Z is oxygen or sulfur;

$B^1$ is hydrogen, $C_1-C_{12}$-alkyl, $C_2$- or $C_3$-alkyl substituted by hydroxyl, $C_1-C_{12}$-alkoxy, phenyl or phenoxy, phenylmethyl, $C_5-C_7$-cycloalkyl, phenyl, phenyl substituted by $C_1-C_{12}$-alkyl, phenylmethyl, phenylethyl, $C_1-C_{12}$-alkoxy, phenoxy, phenylmethoxy, $C_1-C_{12}$ alkanoyloxy, benzoyloxy, phenyl, diphenyl, cyclohexyl, 4-($C_1-C_7$-alkylcyclohexyl), carboxylic ester or chlorine, $C_1-C_{12}$ alkylthio, $C_5-C_7$ cycloalkylthio, phenylmethylthio substituted by $C_1-C_{12}$-alkyl, phenylmethyl, phenyethyl, $C_1-C_{12}$-alkoxy, phenoxy, phenylmethoxy, $C_1-C_{12}$-alkanoyloxy, benzoyloxy, phenyl, diphenyl, cyclohexyl, 4-($C_1-C_7$-alkylcyclohexyl), carboxylic ester or chlorine, or 2-phenylethylthio;

$B^2$ and $B^3$ are each independently hydrogen or methyl; and $B^4$ is $C_1-C_{12}$ alkyl, cyclohexyl, benzyl, 4-($C_1-C_{12}$-alkyl)-benzyl, 4-cyclohexylbenzyl, or 4-(4'-$C_1-C_7$-alkylcyclohexyl)-benzyl.

3. The compound of claim 1, said compound having the formula:

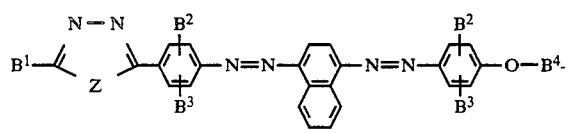

wherein:

Z is oxygen or sulfur;

$B^1$ is hydrogen, $C_1-C_{12}$-alkyl, $C_2$- or $C_3$-alkyl substituted by hydroxyl, $C_1-C_{12}$-alkoxy, phenyl or phenoxy, phenylmethyl, $C_5-C_7$-cycloalkyl, phenyl, phenyl substituted by $C_1-C_{12}$-alkyl, phenylmethyl, phenylethyl, $C_1-C_{12}$-alkoxy, phenoxy, phenylmethoxy, $C_1-C_{12}$-alkanoyloxy, benzoyloxy, phenyl, diphenyl, cyclohexyl, 4-($C_1-C_7$-alkylcyclohexyl), carboxylic ester or chlorine, $C_1-C_{12}$-alkylthio, $C_5-C_7$-cycloalkylthio, phenylmethylthio substituted by $C_1-C_{12}$-alkyl, phenylmethyl, phenylethyl, $C_1-C_{12}$-alkoxy, phenoxy, phenylmethoxy, $C_1-C_{12}$ alkanoyloxy, benzoyloxy, phenyl, diphenyl, cyclohexyl, 4-($C_1-C_7$-alkylcyclohexyl), carboxylic ester or chlorine, or 2-phenylethylthio;

$B^2$ and $B^3$ are each independently hydrogen or methyl; and $B^4$ is $C_1-C_{12}$-alkyl, cyclohexyl, benzyl, 4-($C_1-C_{12}$ alkyl)-benzyl, 4-cyclohexylbenzyl, or 4-(4'-$C_1-C_7$ alkylcyclohexyl)-benzyl.

4. The compound of claim 1, said compound having the formula:

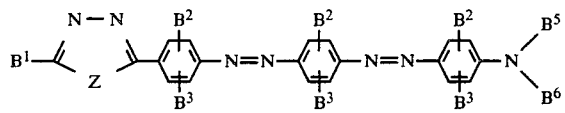

wherein:

Z is oxygen or sulfur;

$B^1$ is hydrogen, $C_1-C_{12}$-alkyl, $C_2$- or $C_3$-alkyl substituted by hydroxyl, $C_1-C_{12}$-alkoxy, phenyl or phenoxy, phenylmethyl, $C_5-C_7$-cycloalkyl, phenyl, phenyl substituted by $C_1-C_{12}$-alkyl, phenylmethyl, phenylethyl, $C_1-C_{12}$-alkoxy, phenoxy, phenylmethoxy, $C_1-C_{12}$-alkanoyloxy, benzoyloxy, phenyl, diphenyl, cyclohexyl, 4-($C_1-C_7$-alkylcyclohexyl), carboxylic ester or chlorine, $C_1-C_{12}$-alkylthio, $C_5-C_7$-cycloalkylthio, phenylmethylthio substituted by $C_1-C_{12}$-alkyl, phenylmethyl, phenylethyl, $C_1-C_{12}$-alkoxy, phenoxy, phenylmethoxy, $C_1-C_{12}$ alkanoyloxy, benzoyloxy, phenyl, diphenyl, cyclohexyl, 4-($C_1-C_7$-alkylcyclohexyl), carboxylic ester or chlorine, or 2-phenylethylthio;

$B^2$ and $B^3$ are each independently hydrogen or methyl;

$B^5$ and $B^6$ are each independently hydrogen, $C_1-C_8$-alkyl, 2-phenylethyl, benzyl, 4-($C_1-C_{12}$-alkyl)benzyl, 4-cyclohexylbenzyl, 4-(4'-$C_1-C_7$-alkylcyclohexyl)benzyl, or cyclohexyl, or $B^5$ and $B^6$, together with a nitrogen atom to which they are both bound, are pyrrolidino, piperidino or morpholino.

5. The compound of claim 1, said compound having the formula:

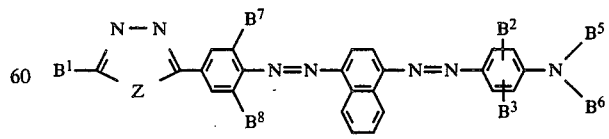

wherein $B^1$ is hydrogen, $C_1-C_{12}$-alkyl, $C_2$- or $C_3$-alkyl substituted by hydroxyl, $C_1-C_{12}$-alkoxy, phenyl or phenoxy, phenylmethyl, $C_5-C_7$-cycloalkyl, phenyl, phenyl substituted by $C_1-C_{12}$-alkyl, phenylmethyl, phenylethyl, $C_1$–$C_{12}$-alkoxy, phenoxy, phenylmethoxy, $C_1$–$C_{12}$-alkanoyloxy, benzoyloxy, phenyl, diphenyl, cyclohexyl, 4-($C_1$–$C_7$-alkylcyclohexyl), carboxylic ester or chlorine, $C_1$–$C_{12}$-alkylthio, $C_5$–$C_7$-cycloalkylthio, phenylmethylthio substituted by $C_1$–$C_{12}$-alkyl, phenylmethyl, phenylethyl, $C_1$–$C_{12}$-alkoxy, phenoxy, phenylmethoxy, $C_1$–$C_{12}$ alkanoyloxy, benzoyloxy, phenyl, diphenyl, cyclohexyl, 4-($C_1$–$C_7$-alkylcyclohexyl), carboxylic ester or chlorine, or 2-phenylethylthio;

$B^2$ and $B^3$ are each independently hydrogen or methyl;

$B^5$ and $B^6$ are each independently hydrogen, $C_1$–$C_8$-alkyl, 2-phenylethyl, benzyl, 4-($C_1$–$C_{12}$-alkyl)benzyl, 4-cyclohexylbenzyl, 4-(4'-$C_1$–$C_7$-alkylcyclohexyl)benzyl, or cyclohexyl, or $B^5$ and $B^6$, together with a nitrogen atom to which they are both bound, are pyrrolidino, piperidino or morpholino; and $B^7$ and $B^8$ are each independently hydrogen, bromine, chlorine or cyano.

6. The compound of claim 1, said compound having the formula:

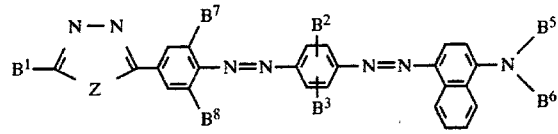

wherein $B^1$ is hydrogen, $C_1$–$C_{12}$-alkyl, $C_2$- or $C_3$-alkyl substituted by hydroxyl, $C_1$–$C_{12}$-alkoxy, phenyl or phenoxy, phenylmethyl, $C_5$–$C_7$-cycloalkyl, phenyl, phenyl substituted by $C_1$–$C_{12}$-alkyl, phenylmethyl, phenylethyl, $C_1$–$C_{12}$-alkoxy, phenoxy, phenylmethoxy, $C_1$–$C_{12}$-alkanoyloxy, benzoyloxy, phenyl, diphenyl, cyclohexyl, 4-($C_1$–$C_7$-alkylcyclohexyl), carboxylic ester or chlorine, $C_1$–$C_{12}$-alkylthio, $C_5$–$C_7$-cycloalkylthio, phenylmethylthio substituted by $C_1$–$C_{12}$-alkyl, phenylmethyl, phenylethyl, $C_1$–$C_{12}$-alkoxy, phenoxy, phenylmethoxy, $C_1$–$C_{12}$ alkanoyloxy, benzoyloxy, phenyl, diphenyl, cyclohexyl, 4-($C_1$–$C_7$-alkylcyclohexyl), carboxylic ester or chlorine, or 2-phenylethylthio;

$B^2$ and $B^3$ are each independently hydrogen or methyl;

$B^5$ and $B^6$ are each independently hydrogen, $C_1$–$C_8$-alkyl, 2-phenylethyl, benzyl, 4-($C_1$–$C_{12}$-alkyl)benzyl, 4-cyclohexylbenzyl, 4-(4'-$C_1$–$C_7$-alkylcyclohexyl)benzyl, or cyclohexyl, or $B^5$ and $B^6$, together with nitrogen atom to which they are both bound, are pyrrolidino, piperidino or morpholino; and $B^7$ and $B^8$ are each independently hydrogen, bromine, chlorine or cyano.

* * * * *